(12) United States Patent
Choi

(10) Patent No.: US 6,847,636 B1
(45) Date of Patent: Jan. 25, 2005

(54) APPARATUS AND METHOD FOR TRANSMITTING AND RECEIVING SIGNALS BETWEEN DIFFERENT NETWORKS

(75) Inventor: Youn-Jeong Choi, Seoul (KR)

(73) Assignee: Hurim Interactive Co., Ltd., Kyoungki-do (KR)

( * ) Notice: Subject to any disclaimer, the term of this patent is extended or adjusted under 35 U.S.C. 154(b) by 703 days.

(21) Appl. No.: 09/649,997

(22) Filed: Aug. 28, 2000

(30) Foreign Application Priority Data

Oct. 8, 1999 (KR) ........................................ 1999-43539

(51) Int. Cl.[7] ........................ H04L 12/66; H04L 12/50
(52) U.S. Cl. ............................... 370/352; 370/466
(58) Field of Search ................................ 370/328, 465, 370/468, 466, 401, 352

(56) References Cited

U.S. PATENT DOCUMENTS

| | | | | |
|---|---|---|---|---|
| 4,893,306 | A | | 1/1990 | Chao et al. ................. 370/94.2 |
| 5,826,017 | A | * | 10/1998 | Holzmann ................... 709/230 |
| 6,259,706 | B1 | * | 7/2001 | Shimada ...................... 370/466 |
| 6,269,252 | B1 | * | 7/2001 | Hutchings et al. ........ 455/552.1 |
| 6,311,072 | B1 | * | 10/2001 | Barclay et al. ............ 455/552.1 |
| 6,320,874 | B1 | * | 11/2001 | Crump et al. ................. 370/466 |

FOREIGN PATENT DOCUMENTS

| | | |
|---|---|---|
| JP | 63-070640 | 3/1988 |
| KR | 10-1997-0081257 | 6/1999 |

\* cited by examiner

*Primary Examiner*—Chau Nguyen
*Assistant Examiner*—Blanche Wong
(74) *Attorney, Agent, or Firm*—Sheridan Ross PC

(57) ABSTRACT

An apparatus and method for transmitting and receiving a signal between different networks, each network having at least one terminal and a different source coding method and transmission rate from those of the other network. The apparatus for transmitting and receiving a signal between different networks includes: a system controller, responsive to a call setup request signal, for inquiring a second coding method used for a second terminal in a second network and informing a first terminal of the second coding method; a data encoder for encoding data signals from the first terminal in accordance with the second coding method; a matcher for changing a transmission rate and a data format of encoded data signals to a transmission rate used in the second network; and a decoder for decoding data signals from the matcher. The apparatus and method for transmitting and receiving a signal between different networks in accordance with the present invention prevents transmission data signals from being transcoded, Therefore, complicated operations and attenuation from the transcoding of the transmission data signals are not needed, such that the quality of communication becomes considerably high.

17 Claims, 4 Drawing Sheets

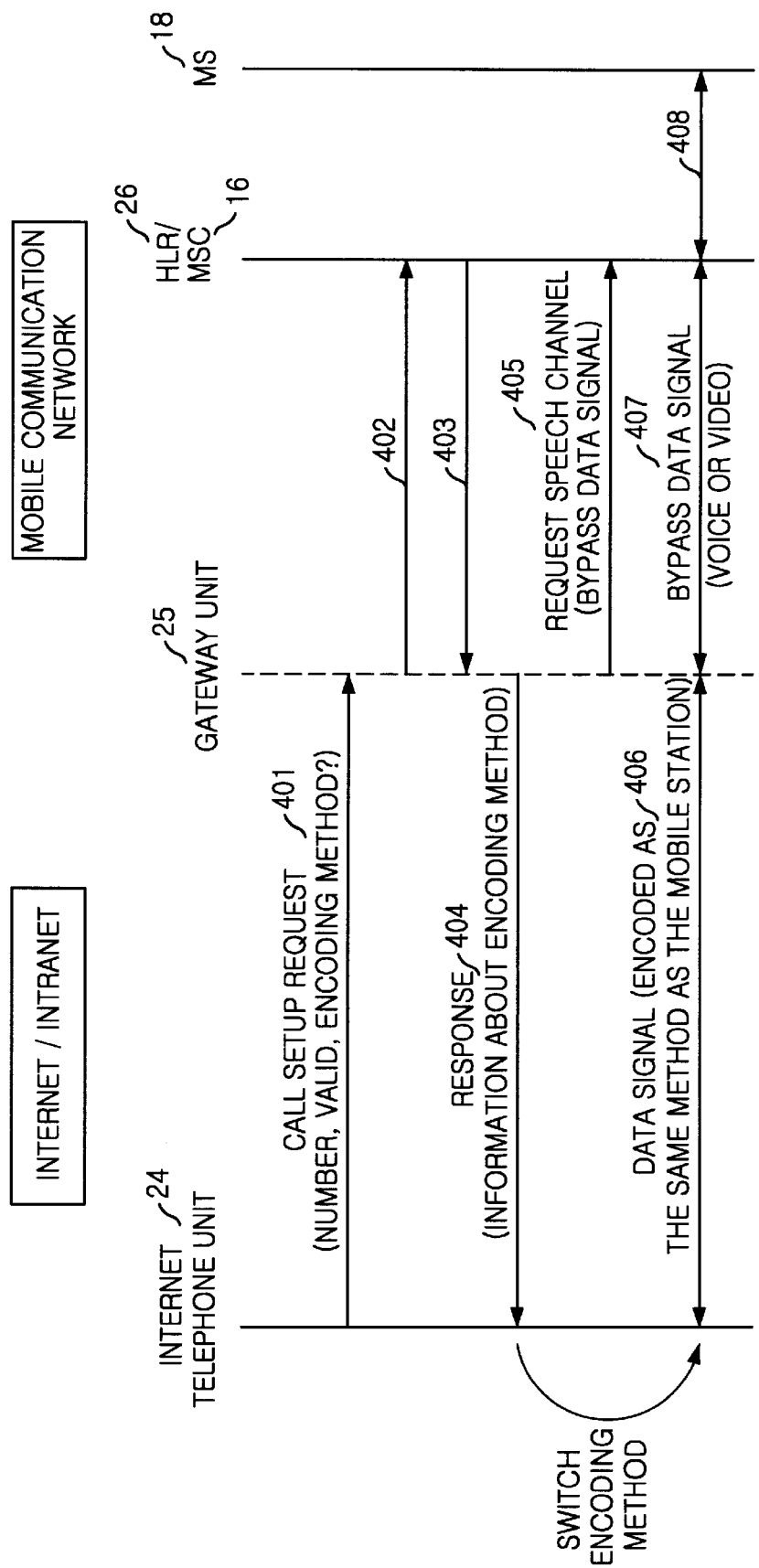

APPARATUS AND METHOD FOR TRANSMITTING AND RECEIVING SIGNALS BETWEEN DIFFERENT NETWORKS

FIELD OF THE INVENTION

The present invention relates to an apparatus and method for transmitting and receiving signals between different networks; and, more particularly, to an apparatus and method for transmitting and receiving signals between a Internet/Intranet and a mobile telecommunication network without time delay and lowering a quality of communication.

PRIOR ART OF THE INVENTION

FIG. 1 shows a conventional system for matching signals between different networks. A reference numeral 11 denotes telephone, 12 an exchanging unit, 13 a Personal Computer (PC), 14 Internet telephone unit, 15 a gateway unit, 16 a Mobile Switching Center (MSC), 17 a Base Station Controller/Base Station Transceiver Subsystem (BSC/BTS) and 18 a Mobile Station (MS).

As illustrated in FIG. 1, in the conventional communication system for matching signals between different networks, the gateway unit 15 matches voice signals between the Internet having the Internet telephone unit 14 coupled to the exchanging unit 12 or the PC 13, and the mobile telecommunication network.

The Internet telephone unit 14 requests a call setup and converts voice signals from the exchanging unit 12 or the PC 13 for Internet. The Internet telephone unit 14 includes a signal processing unit 141, a system controlling unit 142 and an Internet control unit 143.

The system control unit 142 receives a call request signal from the exchanging unit 12 or the PC 13 and then generates a call setup request signal. When the call is setup, in other words, a call setup signal is received through the Internet, the system control unit 142 transmits a call setup signal to the exchanging unit 12 or the PC 13. When the call is setup, the telephone 11 or the PC 13 begins to transmit speech signal, the signal processing unit 141 performs encoding of the speech signal. The Internet controlling unit 143 transmits the signals from the signal processing unit 141 and the system control unit 142 through the Internet.

The mobile telecommunication network includes the Mobile Switching Center (MSC) 16, a plurality of Base Transceiver Station/Base Station Controller (BTS/BSC) 17 and a plurality of Mobile Stations (MS) 18.

One of the ordinary peoples skilled in the art knows the constitution and function of elements of the mobile telecommunication network well, therefore detailed descriptions except for the signal processing function will be skipped in the specification.

The MS 18 is a portable terminal within a service area of a BTS 17. When information about the MS 18 is transmitted from the MS to the MSC 16, the information is transmitted through the BTS 17, the BSC 17 controlling the BTS and the MSC 16. When information is transmitted from the MSC 16 to the MS 18 through the reverse path.

When receiving a signal in Code Division Multiple Access (CDMA) system, the MS 18 uses a data burst message of a paging channel. When the MS to be wanted to communicate with is busy, character message is transmitted to the MS as a type of a data burst message through a forward traffic channel. When transmitting the character message, data burst message of an access channel is used. If the MS is busy, the data burst message is transmitted through a reverse traffic channel.

The message from the MS 18 is transmitted to the MSC 16 through BTS/BSC 17 which performs a call processing and a signal processing of a radio signal.

The BTS 17 couples the MS 18 to the MSC 16, and communicates with the MS through a radio path and with the MSC 16 through a wired line.

The BSC 17 couples the BTS 17 to the MSC 16, controls connections among the BTSs and performs signal processing between the BTS 17 and the MSC 16.

The MSC 16 performs a call processing of a subscriber, a call setup and release of a MS 18 and function related to value added service.

However, in the conventional system for interfacing Internet/Intranet and a mobile telecommunication network, a coding method for Internet/Intranet is different from that for a mobile telecommunication network. Accordingly, a signal cannot be communicated between the Internet/Intranet and the mobile telecommunication network without additional processes.

As illustrated in lower part of FIG. 1, the signals for Internet/Intranet are not sequential data but burst data, and the signals for the mobile telecommunication network are sequential data. Signals for a network using a pulse coded modulation (PCM) method are 64 kbps sequential streams. Signals for the mobile telecommunication network, for example, a cellular network, are 8 kbps sequential streams.

For transmitting and receiving signals in different networks, each of which uses a different coding method and has a different transmission rate, the signals should be transcoded as a common coding method, for example, a pulse code modulation (PCM), and transcoded again to a different coding method for the mobile telecommunication network. At this time, coding/decoding of the voice signal is repeatedly performed, such that a quality of the voice signal decreases and a transmission of the voice signal is delayed because of complex operation from transcoding.

Nowadays, communication between an Internet telephone and a mobile telephone has been increased and will be much more increased. However, the problems as described above, reduction of transmission quality, time delay due to the transcoding, limits to increase the communication service between the Internet telephone and the mobile telephone. Therefore, there needs a method or an apparatus for resolving the problems.

In other words, a conventional Internet telephone unit 14 encodes voice signals in accordance with an encoding method for the Internet, for example, G.711, G.723.1, etc., and transmits the encoded voice signals to a gateway unit 15. The gateway unit 15 performs transcoding of the voice signal encoded according to the encoding method for the Internet in accordance with a pulse code modulation (PCM) method and transmits re-encoded voice signals to a mobile telecommunication network. In the mobile telecommunication network, PCM signals are re-encoded in accordance with an encoding method for a mobile telephone, for example, an enhanced variable rate code (EVRC).

As described above, in conventional system, for communication between the Internet telephone and the mobile telephone, the voice signals are transcoded from the encoding method for the Internet to the PCM and from the PCM to the encoding method for the mobile telephone. At this time, the quality of the voice signal decreases and a transmission of the voice signal is delayed because of complex operation from transcoding.

SUMMARY OF THE INVENTION

Therefore, it is an object of the present invention to provide an apparatus, a method and a computer readable record media storing instructions for executing the same method for interfacing different networks.

In accordance with an aspect of the present invention, there is provided an apparatus for transmitting and receiving a signal between different networks, each of the network having at least a terminal, a different coding method and a different transmission rate, the apparatus comprising: a system control means, responsive to a call setup request signal, for inquiring a second coding method used for a second terminal in a second network and informing a first terminal of the second coding method; a data encoding means for encoding data signals from the first terminal in accordance with the second coding method; a matching means for changing a transmission rate and a data format of encoded data signals to a transmission rate used in the second network; and a decoding means for decoding data signals from the matcher.

In accordance with another aspect of the present invention, there is provided a method for transmitting and receiving a signal between different networks, each of the network having at least a terminal, a different coding method and a different transmission rate, the method comprising the steps of: a) responsive to a call setup request signal, inquiring a second coding method used for a second terminal in a second network and informing a first terminal of the second coding method; b) encoding data signals from the first terminal in accordance with the second coding method; c) changing a transmission rate and a data format of encoded data signals to a transmission rate used in the second network; and d) decoding the changed data signals.

In accordance with still another aspect of the present invention, there is provided a computer readable record media storing instructions for executing a method for transmitting and receiving a signal between different networks, each of the network having at least a terminal, a different coding method and a different transmission rate, the method comprising the steps of: a) responsive to a call setup request signal, inquiring a second coding method used for a second terminal in a second network and informing a first terminal of the second coding method; b) encoding data signals from the first terminal in accordance with the second coding method; c) changing a transmission rate and a data format of encoded data signals to a transmission rate used in the second network; and d) decoding the changed data signals.

BRIEF DESCRIPTION OF THE INVENTION

The above and other objects and features of the instant invention will become apparent from the following description of preferred embodiments taken in conjunction with the accompanying drawings, in which:

FIG. 4 is a flow chart for illustrating a method for transmitting and receiving a signal in different networks.

PREFERRED EMBODIMENTS OF THE INVENTION

Hereinafter, preferred embodiments of the present invention will be described in detail with reference to the accompanying drawings.

Figure 2:
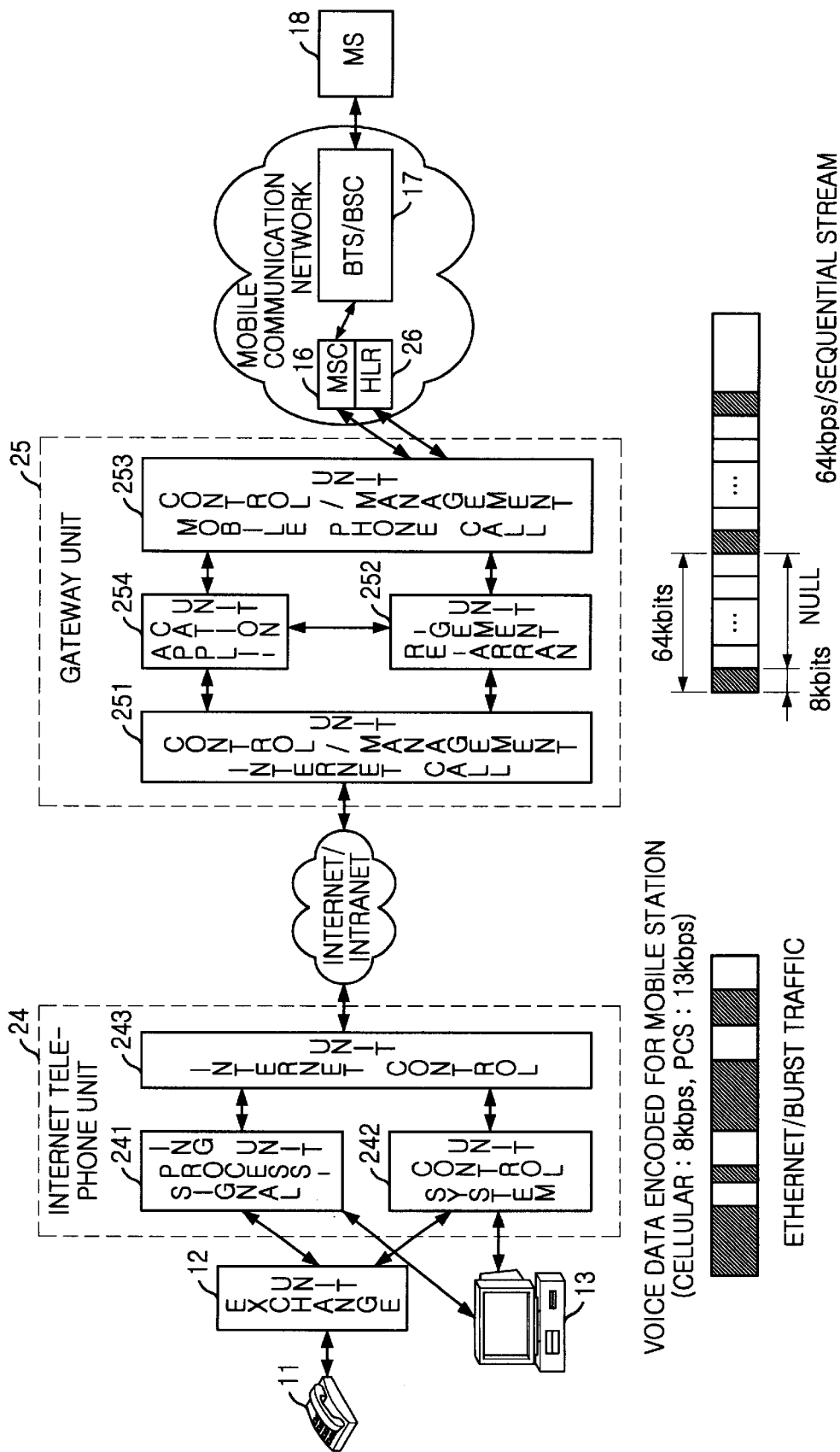
FIG. 2 is a block diagram of a system for interfacing an Internet/Intranet with a mobile telecommunication network in accordance with the present invention.

FIG. 2 is a block diagram of a system for interfacing an Internet/Intranet with a mobile telecommunication network in accordance with the present invention.

A reference numeral 24 denotes an Internet telephone system, 25 a gateway unit, 26 a home location register (HLR).

Figure 1:
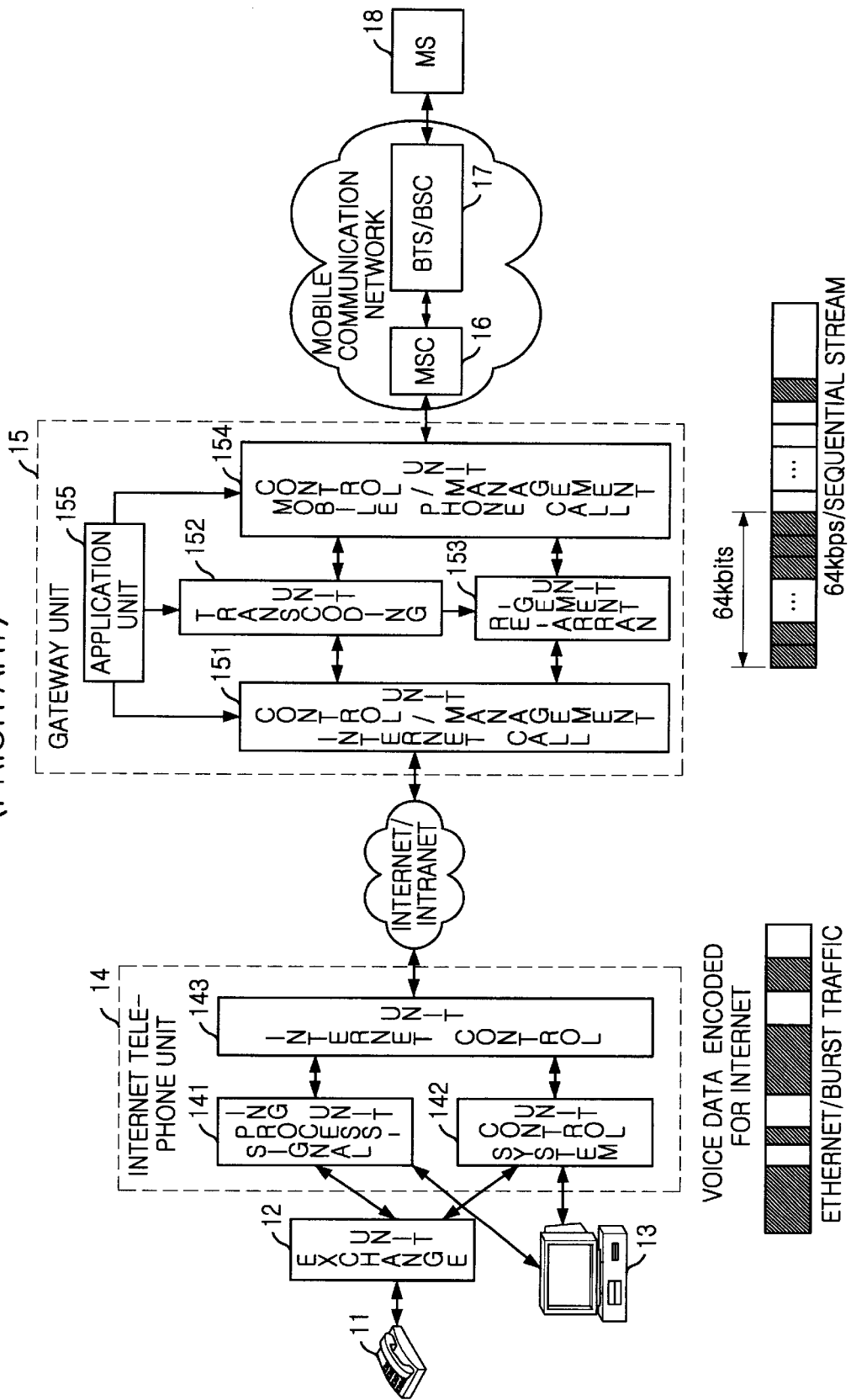
FIG. 1 is a block diagram of a conventional system for interfacing an Internet/Intranet with a mobile telecommunication network.

In this drawing, the HLR 26 is further included in a mobile telecommunication network with comparison to FIG. 1. However, the HLR 26 is included in the general mobile telecommunication network. For obtaining the object of the present invention, only a signal interface function should be added to the HLR 26.

The mobile switching center (MSC) 16 includes a visitor location register (VLR), performs a call processing, a call setup and release and a value added service of a mobile station 18.

The VLR is a database that temporally stores subscriber's information related to a mobile station (MS) 18 while the MS 18 is located within an area controlled by the VLR. The VLR is located in the MSC 16 and gets and temporally stores the subscriber's information related to the mobile station (MS) 18 from the HLR 26.

The HLR 26 coupled to the MSC 16 is a database that has and manages information about the mobile station, for example, subscriber's information and the mobile station location. The information stored in the HLR 26 is provided to the MSC 16 and used for the call processing and the value added service.

The gateway unit 25 interfaces the Internet/Intranet with the mobile telecommunication network. For interface, the gateway unit 25 should be possible to monitor the mobile station 18 and to perform a call setup. Also, the gateway unit 25 communicates and controls a rate of signals between the Internet/Intranet and the mobile telecommunication network.

Burst packet data are transmitted in Internet/Intranet, and circuit based data are transmitted at a certain data rate in public switching telephone network/mobile telecommunication network.

The system for interfacing signals between different networks, for example, between an Internet and a mobile telecommunication network, in accordance with the present invention includes an Internet telephone system 24 and a gateway unit 25.

The Internet telephone system 24 is included in a first network, for example, in the Internet. The Internet telephone system 24 includes both of a first encoding unit which encodes signals based on a first coding method for the first network (the Internet in this embodiment) and a second encoding unit which encodes signals based on a second coding method for the second network (the mobile telecommunication network in this embodiment). The Internet telephone system 24 inquires which method is used for the second network, receives information identifying the second encoding method and encodes data signals based on the second encoding method. The Internet telephone system sets a call such that the data signals encoded based on the second encoding method are directly transmitted to a mobile station 18 without being transcoded. Accordingly, the data signals to be transmitted to the mobile station 18 are not transcoded and only re-arranged based on a data format and a data rate of the second encoding method, thereby providing voice or video communication service.

The Internet telephone system 24 includes a signal processing unit 241, a system control unit 242 and an Internet control unit 243.

The signal processing unit 241 receives and encodes data signals from a telephone 11 or a personal computer (PC) 13 based on the second encoding method. While the data signals are transcoded twice, e.g., in the gateway unit 15 and the mobile station 18 in the conventional interface system, the data signals are not transcoded and directly transmitted to the mobile station 18 in the present invention. In the conventional system, the signal processing unit 141 encodes the data signals based on a predetermined encoding method. However, in the present invention, the signal processing unit 241 receives information having the second encoding method for the mobile telecommunication network at a call setup time and encodes the data signals based on the second encoding method.

When receiving a call setup request signal from the telephone 11 and the PC 13, the system control unit 242 generates a call setup signal and an inquiry signal inquiring which encoding method is used for the mobile telecommunication network. Then, the system control unit 242 receives and provides the signal processing unit 241 with information indicating the encoding method for the mobile telecommunication network.

The Internet control unit 243 receives and converts signals from the signal processing unit 241 and the system control unit 242 into signals having a format and a rate appropriate for the Internet.

The gateway unit 25 controls the signals received from the Internet to be transmitted to the mobile station 18 without transcoding. The gateway unit 25 includes an Internet call control/management unit 251, a re-alignment unit 252, a mobile phone call control/management unit 253 and an application unit 254.

The re-arrangement unit 252 converts the signals received through the Internet call control/management unit 251 into signals having a data format and a data rate appropriate for the mobile station 18.

The apparatus for interfacing between different networks in accordance with the present invention will be described in more detail.

The Internet telephone system 24 includes both of encoding protocols for a conventional Internet telephone system and a mobile telecommunication system. One of the encoding protocols is selected in accordance to the information about the mobile station 18.

In this specification, the Internet telephone system 24 is described as a separate device from the telephone 11 or the PC 13. However, the Internet telephone system 24 can be also placed in the telephone 11 or the PC 13.

The gateway unit 25 includes the Internet call control/management unit 252, the mobile phone call control management unit 253 and the application unit 254. The gateway unit 25 interfaces signals between the Internet/Intranet and the mobile telecommunication network.

When receiving the call setup request signal from the Internet/Intranet, the gateway unit 25 obtains the information about the mobile station 18 and provides the Internet telephone system 14 coupled to the telephone 11 or the PC 13 with the information identifying the second encoding method, such that the Internet telephone system 24 can convert the data signals based on the second encoding method. The gateway unit 25 sets a call, such that the data signals are not transcoded in the mobile telecommunication network and bypassed to the mobile station 18. Signals from the mobile station 18 to the Internet telephone system 14 are transmitted in accordance with the same method as the signal from the Internet telephone system 14 to the mobile station.

The gateway unit 25 re-arranges the data signals to be appropriate to the data format of the network to which the data signals are transmitted, and controls the rate of the signals in the re-arrangement unit 252. For example, the burst packet data from the computer network such like the Internet are re-arranged as 64 kbps sequential data which are appropriate to the mobile telecommunication network. In other words, the transmission path from the gateway unit 25 to the mobile telecommunication network has a 64 kbps data rate, the mobile telecommunication network has an 8 kbps data rate. Accordingly, the gateway unit 25 re-arranges the data signals to be transmitted to the mobile telecommunication network, such that the data signal contains 8 kbits data signals and 56 kbits null signals.

The signals from the mobile telecommunication network are re-arranged through the similar process as the mentioned above. Therefore, detailed description will be skipped.

In the mobile telecommunication network, the signals from the gateway unit are directly transmitted to the mobile station 18 without any further process. The mobile station receives and decodes the signals and restores original signals.

While, in this specification, only a case is described where a telephone or a personal computer in the computer network makes a call to a mobile station in the mobile telecommunication network, it is appreciate to one of ordinary people skilled in the art that the reverse can also be implemented. In other words, when the mobile station makes a call to the telephone or the PC in the computer network, the mobile station determines whether the telephone or the PC is connected to the network, through the gateway unit by using short message service (SMS) or wireless application protocol (WAP). If the PC 13 is connected to the computer network, the mobile station tries to make a call. The gateway unit monitors that the Internet telephone system 14 coupled to the PC 13 can be executed. In this case, the mobile station transmits its encoding method to the Internet telephone system, the Internet telephone system switches the encoding method to the received encoding method and encodes the signals from the telephone 11 or the PC 13 to the mobile station 18 based on the received encoding method.

Therefore, the present invention can be applied to all of communications of signals between the computer network and the mobile telecommunication network.

Also, the present invention can be applied to a next generation telecommunication, for example, an international mobile telecommunication-2000 (IMT-2000) in which not only voice communication but also image communication can be provided. The present invention can also be applied to image communication and video conference. In this case, functions executing encoding methods for video signals are added to the Internet telephone system and information about data format and data rate of the video signals are additionally provided to the re-arrangement unit.

Figure 3:
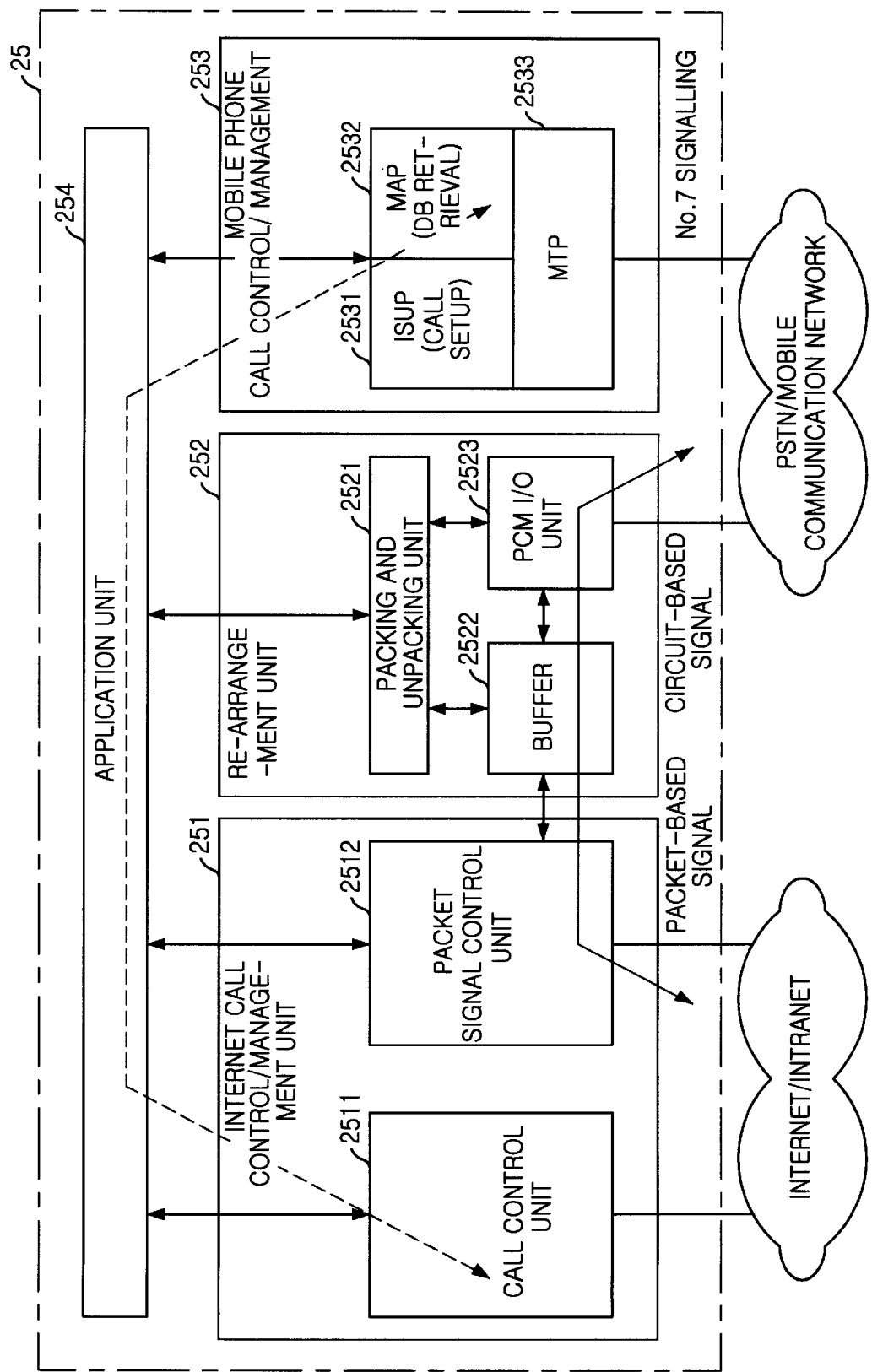
FIG. 3 is a block diagram of a gateway unit in accordance with an embodiment of the present invention.

FIG. 3 is a block diagram of a gateway unit in accordance with an embodiment of the present invention.

The gateway unit 25 includes an Internet call control/management unit 251, a re-arrangement unit 252, a mobile phone call control/management unit 253 and an application unit.

The Internet call control/management unit 251 includes a call control unit 2511 and a packet signal control unit 2512. The re-arrangement unit 252 includes a packing and unpacking unit 2521, a buffer 2522 and a PCM Input/Output unit 2523. The mobile phone call control/management unit 253 includes ISDN user part (ISUP) 2531, a mobile application part (MAP) 2532 and a message transfer part 2533. In this embodiment, for easy description, a case where the PC or the telephone wants to make a call to the mobile station will be described in detail.

The Internet call control/management unit 251 performs general control functions of the signals from the Internet/Intranet.

The call control unit 2511 controls a call from the computer network, e.g., the Internet. The call control unit 2511 receives a call setup request signal, generates an inquiry signal asking a kind of the encoding method used for the mobile station and transmits the call setup request signal and the inquiry signal to the application unit 254.

The application unit 254 performs access to database for searching address or number, error check and management of network. When receiving the call setup request signal and the inquiry signal, the application unit 254 respectively transmits the call setup request signal and the inquiry signal to the ISUP 2531 and the MAP 2532.

The ISUP 2531 sets a call from the Internet/Intranet to the mobile telecommunication network in response to the call request setup signal from the application unit 254. Since, the data signals to be transmitted to the mobile station 18 are encoded as the same encoding method as the mobile station 18, the ISUP 2531 sets the call such that the data signals are bypassed to the mobile station 18 in the mobile telecommunication network. Therefore, the mobile telecommunication network should perform bypass function of the data signal.

The MAP 2532 retrieves the home location register (HLR) 26, obtains information about the mobile station and returns the retrieval result to the Internet telephone system 14 through the application unit 254 and the call control unit 2511. Therefore, the Internet telephone system 14 can encodes the data signals as the same encoding method as the mobile station 18.

If the information about the encoding method of the mobile station is stored on the others system element, for example, on the mobile station, it is appreciated to one skilled in the art that the retrieval function can be performed by modifying the apparatus and the method in accordance with the present invention.

After setting the call, the data signals are inputted to the gateway unit through the Internet.

The packet signal control unit 2512 performs capsulization and synchronization of the packet data stream. The capsulization means a function which corrects an error and controls transfer order of the packet data stream. When the packets are received, the packets may be out of order. At this time, the order of the packets should be re-arranged, which refers to the synchronization of packet data stream.

Though the data signals from the Internet are already encoded as the same method as the mobile station 18, the data signals have a different transfer protocol from the mobile station. Accordingly, the data signals should be re-arranged so as to have the same transfer protocol. The re-arrangement unit 252 re-arranges the data signals.

The re-arrangement unit 252 includes the packing/unpacking control unit 2521, the voice buffer 2522 and the PCM input/output unit 2523.

A general encoding method used for the public switched telecommunication network is the pulse code modulation (PCM). In order to interface the packet-based network (the Internet) with the circuit network (the PSTN), the packet signal control unit 2512 converts the rate of the data signals by controlling the data signal to be loaded to E1 trunk having a constant time slot. Since the general encoding method used for the PSTN is the PCM, the PCM is described as the encoding method for interfacing the Internet with the PSTN in this embodiment only for easy description. However, any encoding method for the communication network to be connected can be used.

The packing/unpacking control unit 2521 generates control signals necessary to convert the data signal to packet and the packet signal to the sequential data signal in response to a control signal from the application unit 254.

In order to the rate of the burst data signal to a rate of the PCM signal having the constant rate, the voice buffer stores and outputs the data signals from the packet signal transfer control unit 2512 at a certain rate. When the received signals are packet signals, the packet signals are unpacked and converted to the sequential signals.

The PCM input/output unit 2523 re-arranges the sequential signals from the voice buffer as the format of the PCM when the PCM encoding method is used for interfacing the PSTN with the mobile telecommunication network.

In conventional system, for communication between the Internet telephone and the mobile telephone, the voice signals are transcoded from the encoding method for the Internet to the PCM and from the PCM to the encoding method for the mobile telephone. At this time, the quality of the voice signal decreases and a transmission of the voice signal is delayed because of complex operation from transcoding, which an operation system having a large capacity is required. Therefore, in the conventional system, while the function inquiring the kind of the encoding method used for the mobile station is not necessary, the complex transcoding operation should be performed.

On contrast, in the present invention, the Internet telephone system obtains the information having the encoding method of the mobile station and then encodes the data signals from the telephone or the PC based on the encoding method used for the mobile station. Accordingly, the call should be set such that the data signals are bypassed.

While, in this specification, only a case is described where a telephone or a personal computer in the computer network makes a call to a mobile station in the mobile telecommunication network, it is appreciate to one skilled in the art that the reverse can also be implemented. In other words, when the mobile station makes a call to the telephone or the PC in the computer network, the mobile station determines whether the telephone or the PC is connected to the network, through the gateway unit by using short message service (SMS) or wireless application protocol (WAP). If the PC 13 is connected to the computer network, the mobile station tries to make a call. The gateway unit monitors that the Internet telephone system 14 coupled to the PC 13 can be executed. In this case, the mobile station transmits its encoding method to the Internet telephone system, the Internet telephone system switches the encoding method to the received encoding method and encodes the signals from the telephone 11 or the PC 13 to the mobile station 18 based on the received encoding method.

Therefore, the present invention can be applied to all of communications of signals between the computer network and the mobile telecommunication network.

Also, the present invention can be applied to a next generation telecommunication, for example, an international mobile telecommunication-2000 (IMT-2000) in which not only voice communication but also image communication can be provided. The present invention can also be applied to image communication and video conference. In this case, functions executing encoding methods for video signals are added to the Internet telephone system and information about data format and data rate of the video signals are additionally provided to the re-arrangement unit.

FIG. 4 is a flow chart for illustrating a method for transmitting and receiving a signal in different networks.

First, the Internet telephone system 24 generates a call setup request signal having a number of a mobile station to be wanted to communicate and an inquiry signal inquiring a kind of encoding method used for the mobile station at step 401. The gateway unit 25 receives and transmits to the home location register (HLR) 26 the call setup request signal. The information having the kind of the encoding method is transmitted to the Internet telephone system through the gateway unit at step 403 and 404.

The gateway unit 25 requests the mobile switching center (MSC) 16 to set up a speech channel such that data signals from the Internet telephone system 14 are bypassed at step 405. The Internet telephone system encodes and transmits the data signals from the telephone or the PC in accordance with the same encoding method as that for the mobile station at step 406. The encoded data signals are bypassed to the mobile station at steps 407 and 408.

The apparatus and method for transmitting and receiving a signal between different networks in accordance with the present invention prevents transmission data signals from being transcoded.

Therefore, complicated operations and attenuation from the transcoding of the transmission data signals are not needed, such that the quality of communication becomes considerably high.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. An apparatus for transmitting and receiving a signal between different networks, each of the networks having at least a terminal, a different coding method and a different transmission rate, the apparatus comprising:

a system control means, responsive to a call setup request signal from a first terminal of a first network, for inquiring of a second network as to a coding method for encoding data signals from the first terminal so that resulting encoded data signals yield a desired result at a second terminal in the second network;

a data encoding means for receiving an identity of the coding method from the second network, selecting the identified coding method, and encoding data signals from the first terminal in accordance with the coding method, thereby generating the encoded data signals;

a matching means for changing a transmission rate and a data format of the encoded data signals in accordance with a transmission rate and a data format used in the second network, thereby generating rearranged data signals; and a transmitting means for transmitting the rearranged data signals from the matching means to the second terminal.

2. The apparatus as recited in claim 1, wherein the first network includes an Internet/Intranet network.

3. The apparatus as recited in claim 2, wherein the second network includes a mobile telecommunication network.

4. The apparatus as recited in claim 2, further comprising means for packing the encoded data signals.

5. The apparatus as recited in claim 2, wherein the matching means includes:

means for generating an unpack control signal;

means for storing the encoded data signals, for unpacking the encoded data signals based on the unpack control signal and for converting resulting unpacked data signals into sequential signals; and means for outputting the sequential signals in accordance with a second transmission rate.

6. The apparatus as recited in claim 1, wherein the system control means includes:

a call control means, responsive to the call setup signal, for generating an inquiry signal as to the identity of the coding method;

a call setup means, responsive to the call setup signal, for setting up a call; and a retrieve means, responsive to the inquiry signal, for obtaining from a database, information related to the second terminal, and for providing to an interface with the first network the information related to the second terminal, wherein said interface includes said data encoding means.

7. The apparatus as recited in claim 6, wherein the call setup means sets up a call so that the encoded data signals bypass an encoding operation for the second network.

8. The apparatus as recited in claim 3, wherein the data signals include a voice signal and a video signal.

9. A method for transmitting and receiving a signal between different networks, each of the networks having at least a terminal, a different coding method and a different transmission rate, the method comprising the steps of:

a) responsive to a call setup request signal initiated by a first terminal of a first of the networks, inquiring as to a coding method used for communicating with a second terminal in a second of the networks;

b) selecting the coding method and encoding data signals from the first terminal in accordance with the coding method, thereby generating encoded data signals;

c) changing a transmission rate and a data format of the encoded data signals in accordance with a transmission rate and a data format used in the second network, thereby generating rearranged data signals; and d) transmitting the rearranged data signals to the second terminal.

10. The method as recited in claim 9, wherein the first network includes an Internet/Intranet network.

11. The method as recited in claim 10, wherein the second network includes a mobile telecommunication network.

12. The method as recited in claim 10, further comprising the step of packing the encoded data signal.

13. The method as recited in claim 10, wherein the step c) includes the steps of:

c1) generating an unpack control signal;

c2) storing the encoded data signals, unpacking the encoded data signals based on the unpack control signal and converting the unpacked data signals into sequential signals; and c3) outputting the sequential signals in accordance with a transmission rate of the second network.

14. The method as recited in claim 9, wherein the step a) includes the steps of:
   a1) responsive to the call setup signal, generating an inquiry signal for determining an identity of the coding method;
   a2) responsive to the call setup signal, setting up a call; and
   a3) responsive to the inquiry signal, obtaining from a database, information related to communicating with the second terminal, and providing the information to an encoder for performing step b).

15. The method as recited in claim 14, wherein the encoded data signals bypass an encoding operation for the second network in the step a2).

16. A computer readable record media storing instructions for executing a method for transmitting and receiving a signal between different networks, each of the network having at least a terminal, a different coding method and a different transmission rate, the method comprising the steps of:
   a) responsive to a call setup request signal from a first of the networks, inquiring for an identity of a coding method used for communicating with a second terminal in a second of the networks and informing a first terminal of the first network of the identity of the coding method;
   b) encoding data signals from the first terminal in accordance with the coding method, thereby generating encoded data signals;
   c) changing a transmission rate and a data format of the encoded data signals in accordance with a transmission rate and a data format used in the second network, thereby generating rearranged data signals; and
   d) decoding the rearranged data signals.

17. An apparatus for transmitting and receiving a signal between different networks, each of the networks having at least a terminal, a different coding method, and a different transmission rate, the apparatus comprising:

a system control means, responsive to a call setup request signal from a first terminal of a first network, for inquiring of a second network as to a coding method for encoding data signals from the first terminal so that resulting encoded data signals yield a desired result at a second terminal in the second network;

a data encoding means for receiving an identity of the coding method from the second network, selecting the identified coding method, and encoding data signals from the first terminal in accordance with the coding method, thereby generating the encoded data signals;

a matching means for changing a transmission rate and a data format of the encoded data signals in accordance with a transmission rate and a data format used in the second network, thereby generating rearranged data signals; and a transmitting means for transmitting the rearranged data signals from the matching means to the second terminal;

wherein the system control means further includes (a) through (c) following:
   (a) a call control means, responsive to the call setup signal, for generating an inquiry signal as to the identity of the coding method;
   (b) a call setup means, responsive to the call setup signal, for setting up a call; and
   (c) a retrieve means, responsive to the inquiry signal, for obtaining from a database, information related to the second terminal, and for providing to an
      interface with the first network the information related to the second terminal,
      wherein said interface includes said data encoding means; and wherein the call setup means sets up a call so that the encoded data signals bypass an encoding operation for the second network.

* * * * *